United States Patent [19]

Sword

[11] Patent Number: 4,793,726
[45] Date of Patent: Dec. 27, 1988

[54] CONNECTOR (SLIDER)

[76] Inventor: Alexander F. Sword, 59201 Sword Pl., Vernonia, Oreg. 97064

[21] Appl. No.: 58,233

[22] Filed: Jun. 4, 1987

[51] Int. Cl.$^4$ .............................................. B25G 3/00
[52] U.S. Cl. .................................... 403/316; 403/353; 294/74
[58] Field of Search ............... 403/353, 315, 316, 164, 403/165, 166; 294/82.14, 82.23, 74

[56] References Cited

U.S. PATENT DOCUMENTS

| | | |
|---|---|---|
| 561,855 | 6/1897 | Baptist . |
| 653,397 | 7/1900 | Pettijohn ............................. 403/353 |
| 1,453,138 | 4/1923 | Holliday .............................. 403/353 |
| 1,653,092 | 12/1927 | Draper ................................. 403/353 |
| 3,332,117 | 7/1967 | McCarthy ........................... 403/315 |
| 3,870,357 | 3/1975 | Wernsing ........................ 403/353 X |

Primary Examiner—Andrew V. Kundrat
Attorney, Agent, or Firm—Kolisch, Hartwell & Dickinson

[57] ABSTRACT

The connector of the instant invention includes an elongate body having a side wall thereabout, a base at one end thereof and a nubbin-receiving chamber therein. The chamber has an upper, nubbin-insertion region which is sized freely to receive a nubbin therein, and a lower, nubbin-seating region. The chamber has a first opening in the side wall adjacent the upper region which is sized to allow passage of a nubbin therethrough. A second opening is provided in the side wall which is located below and connected to the first opening and extends into the base. The second opening is sized to allow passage only of a cable therethrough. A spring-biased nubbin retainer is located at the upper end of the nubbin-insertion region and includes a shaft which extends through and is axially moveable in the upper end of the nubbin-insertion region. A plate is mounted on the end of the shaft in the nubbin-insertion region. The shaft and plate are arranged such that the plate, when fully extended into the insertion region, is spaced apart from a nubbin seated in the seating region. An attachment structure is located at the other end of the body for attaching the connector to a hauling line. A formation is located adjacent the other end of the body and has an assymmetry characteristic which prevents adjacent connectors on a line from stack-nesting.

19 Claims, 2 Drawing Sheets

CONNECTOR (SLIDER)

BACKGROUND AND SUMMARY OF THE INVENTION

The instant invention relates to logging equipment and specifically to a connector for connecting a choker or downline to a hauling line.

There are several arrangements of hauling lines which are used in logging yarding operations. One form of yarding arrangement involves a fixed skyline which has a carriage moveable thereon. Drop lines extend downwards from the carriage and terminate with line enders. Connectors are used at the free ends of the drop line to attach choker cables thereto, the choker cables being secured to logs.

Connectors are also used with a cable that is attached to the winch on a Caterpillar ® type vehicle, or to a skidder. The line may be equipped with a line ender or simply have a knot tied in the end thereof. Several connectors may be arranged on a line for connecting to choker cables which are attached to logs.

Known connections have a tendency to stack against one another and eliminate flexibility from the cable to which they are attached. This tendency is referred to herein as nesting or stack-nesting. Additionally, connectors which are constructed to receive a nubbin, which is located on the end of a cable, have a tendency to release the nubbin if the line goes slack. This requires reconnection of the choker cables to the connectors and results in operational delays of the logging process and increased costs.

Connectors which are designed to retain the nubbin generally require intricate manipulation to insert and remove the nubbin and additionally require complex casting and machining during the manufacturing process.

Connectors which do not have any means for retaining nubbins therein tend to scatter in the event of a line break. By the very nature of the environment in which connectors are used, such a scattering generally results in a total loss of the connectors because they become embedded in in underbrush where they cannot easily be found.

Known connectors which are designed to retain a nubbin securely therein do not permit movement of a nubbin in the connector. This results in increased wear on the cables to which the nubbin is attached and reduces the useable life of the cable.

An object of the instant invention is to provide a connector which will not stack or nest on another connector.

Another object of the instant invention is to provide a connector which will retain a choker nubbin while allowing the nubbin to freely move within a nubbin receiving chamber.

Yet another object of the instant invention is to provide a connector which is relatively easy and inexpensive to manufacture and which provides for easy insertion and removal of a nubbin therein.

The connector of the instant invention includes an elongate body having a side wall thereabout, a base at one end thereof and a nubbin-receiving chamber therein. The chamber has an upper, nubbin-insertion region which is sized freely to receive a nubbin therein, and a lower, nubbin-seating region. The chamber has a first opening in the side wall adjacent the upper region which is sized to allow passage of a nubbin therethrough. A second opening is provided in the side wall which is located and connected to the first opening and extends into the base. The second opening is sized to allow passage only of a cable therethrough. A spring-biased nubbin retainer is located at the upper end of the nubbin-insertion region and includes a shaft which extends through and is axially moveable in the upper end of the nubbin-insertion region. A plate is mounted on the end of the shaft in the nubbin-insertion region. The shaft and plate are arranged such that the plate, when fully extended into the insertion region, is spaced apart from a nubbin seated in the seating region. An attachment structure is located at the other end of the body and has a wasted area therein for receiving a line. A formation is located adjacent the other end of the body which has an assymmetry characteristic which prevents adjacent connectors on a line from stack-nesting.

These and other objects and advantages of the invention will become more fully apparent as the description which follows is read in connection with the drawings.

DETAILED DESCRIPTION OF THE PREFERRED EMBODIMENTS

Figure 2:
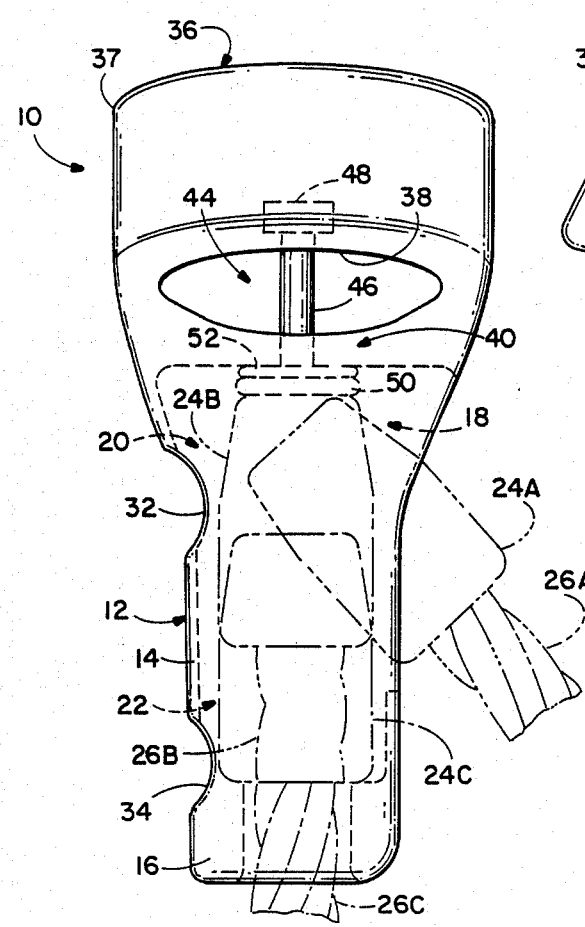
FIG. 2 is a front plan view of the connector of the invention, depicting successive steps in a nubbin insertion procedure.
Figure 1:
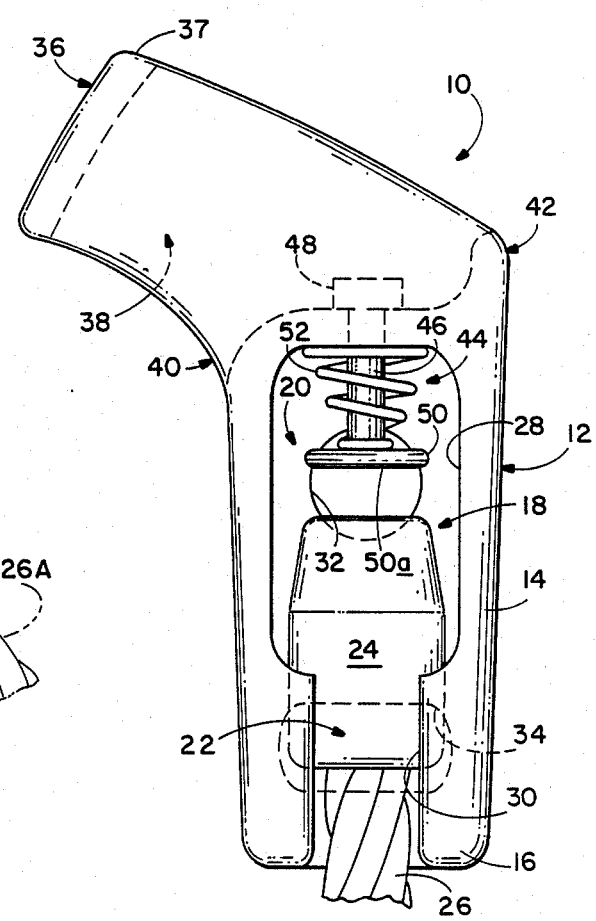
FIG. 1 is a side plan view of the connector of the invention.

Turning now to the drawings, and initially to FIGS. 1 and 2, a connector constructed according to the invention is shown generally at 10. Connector 10 includes an elongate body 12 have a side wall 14 thereabout. A base 16 is located at one end of body 12.

A nubbin-receiving chamber 18 is formed within body 12. Chamber 18 includes an upper, nubbin-insertion region 20 and a lower, nubbin-seating region 22.

In FIG. 1, a press-type nubbin 24, which is attached to a choker cable 26, is depicted in seating region 22. A first opening 28 is associated with nubbin insertion region 20 and is sized to allow passage of nubbin 24 therethrough. A second opening 30 is connected to first opening 28 and extends through side wall 14 into base 16. Second opening 30 is sized to allow passage of a cable, or choker cable, but is not large enough to allow passage of the nubbin therethrough.

Body 12 also includes debris clearing holes 32 and 34 which are formed in side wall 14 to facilitate removal of dirt and other debris from connector 10. Additionally, connector 10 has less weight because of the presence of holes 32, 34. The holes are tapered inward to facilitate casting and debris removal. The presence of hole 34 may, in some instances, facilitate insertion and removal of nubbin 24.

In the preferred embodiment, connector 10 includes a head 36 which extends laterally to one side of body 12 at an end thereof. Head 36 has a generally circular form including a bail 37 and a wasted area 38 in the central portion thereof. The wasted area is designed to receive a line therethrough. Head 36 provides attachment means for attaching connectors 10 to a line. Attachment means may also be constructed and arranged to allow connection to a nubbin on a line.

Head 36 makes an elbow-like bend with respect to body 12 and defines a first region, depicted generally at 40, having a first, or inner radius of curvature. A second region, shown generally at 42, has a second or outer radius of curvature. Second region 42 is diametrically opposite to first region 40. The radius of curvature of the second region is less than that of the first region and acts as a small radius fulcrum, also referred to herein as an anti-nesting structure. The anti-nesting structure comprises a formation at an end of the body which has assymetrical characteristics to prevent stack-nesting of adjacent connectors on a line. When the inner radius of a connector confronts the large, outer radius of an adjacent connector, the first connector will be rotated off of the second connector.

A nubbin retainer is depicted generally at 44. Retainer 44 in the preferred embodiment, includes a threaded shaft 46 which extends through the top of chamber 18 into wasted area 38. Capture means 48 is located in wasted area 38 and prevents shaft 46 from completely entering chamber 18. In the preferred embodiment, capture means 48 takes the form of a hexnut which cooperates with threads on shaft 46. The end of shaft 46 may be flared or otherwise permanently secured to capture means 48 to prevent the separation of the two components.

The other end of shaft 46 has a plate 50 secured thereto. In this embodiment, plate 50 takes the form of a flat structure which is fixed to the end of shaft 46. Plate 50 provides a flat nubbin contacting surface 50a for nubbin 24.

Shaft 46 and plate 50 are spring-biased by a spring 52 to extend shaft 46 and plate 50 fully into chamber 18. In the preferred embodiment, spring 52 is of the cone type and is arranged to encircle shaft 46. Use of a cone spring provides maximum clearance for nubbin insertion/removal when retainer 44 is deflected such that plate 50 approaches the top of chamber 18.

Retainer 44 is constructed and arranged such that when plate 50 is fully extended into insertion region 20, the lower surface of plate 50 is spaced apart from the top of a nubbin which is seated in the nubbin-seating region. This provides that the nubbin may move freely within chamber 18 but may not escape from the chamber without compressing spring 52. Free movement of nubbin 24 within chamber 18 minimizes wear on cable 26, thereby extending the life of the choker.

Referring now to FIG. 2, successive steps in nubbin insertion/removal are depicted. Nubbin 24A is shown in an initial position having been inserted into chamber 18 and fully compressing spring 52, thereby raising plate 50 to an upper portion of chamber 18.

Cable 26A is then shifted to the position depicted by 26B wherein the top of nubbin 24B fully contacts plate 50. The nubbin is then lowered to the position depicted by 24C in seating region 22. The above described steps are reversed to remove nubbin 24 and cable 26 from the connector.

Figure 3:
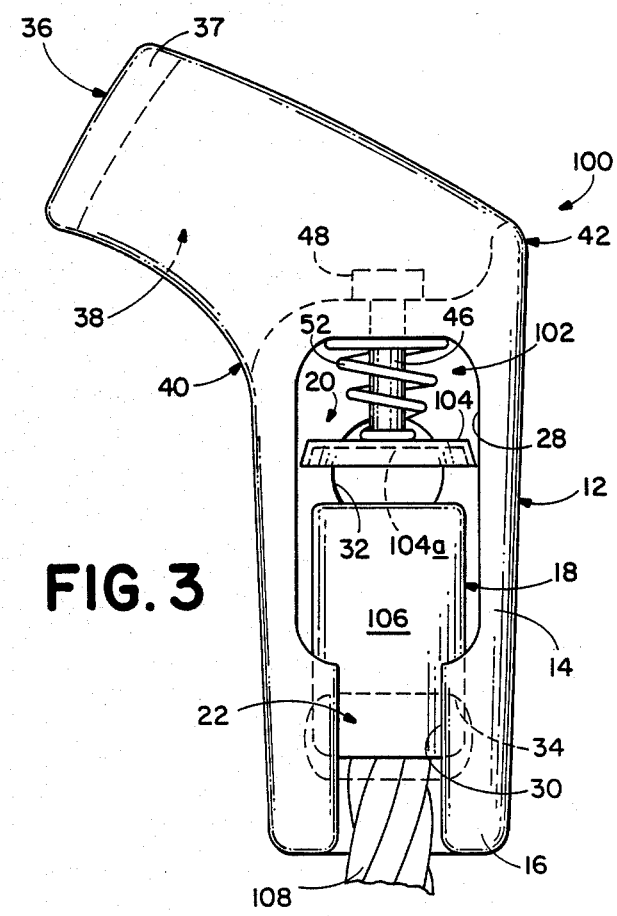
FIG. 3 is a side plan view of a modified form of the invention.

Referring now to FIG. 3, a modified form of the connector is depicted generally at 100. Connector 100 is similar to connector 10 with the exception of nubbin retainer 102. Retainer 102 has a cupped plate 104, attached to the end of shaft 46, which is formed to cooperate with a poured nubbin 106, attached to the end of a choker cable 108. Plate 104 provides a cup-shaped nubbin contacting surface 104a for nubbin 106.

Figure 4:
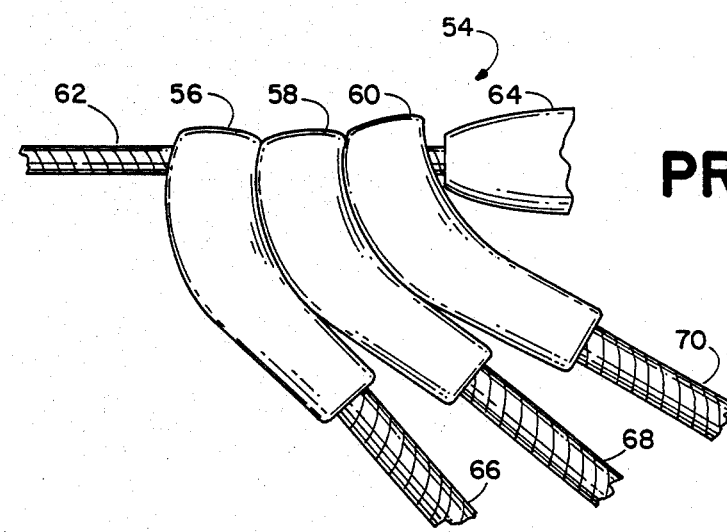
FIG. 4 is a representation of prior art connectors in a stack-nested condition.

Referring now to FIG. 4, an array 54 of known connectors 56, 58 and 60 are shown positioned on a line 62. A line ender 64 is positioned on line 62. The connectors depicted in array 54 have substantially conformal inner and outer radii of curvature between the head and body of the connectors. This allows what is referred to herein as stack-nesting of the connectors on line 62. In this situation, line 62 is made ridged by the nested array of connectors and is therefore more easily damaged or broken. Once connectors 56, 58 and 60 have loads placed on them, which are attached to cables 66, 68 and 70, respectively, the array acts like a solid structure in that it is very difficult to dislodge the connectors from their nested condition.

As line 62 is drawn taught, the connector may form a J-like bend in the line which may become a permanent kink. This places undue stress on the line and shortens the usable life thereof. A kinked end on a line also causes problems when the line is drawn out to a loading area where the chokers are to be set. A bend or kink also presents an opportunity for the connectors to orient themselves in a manner such that nubbins will be released at a point where release in not intended.

Figure 5:
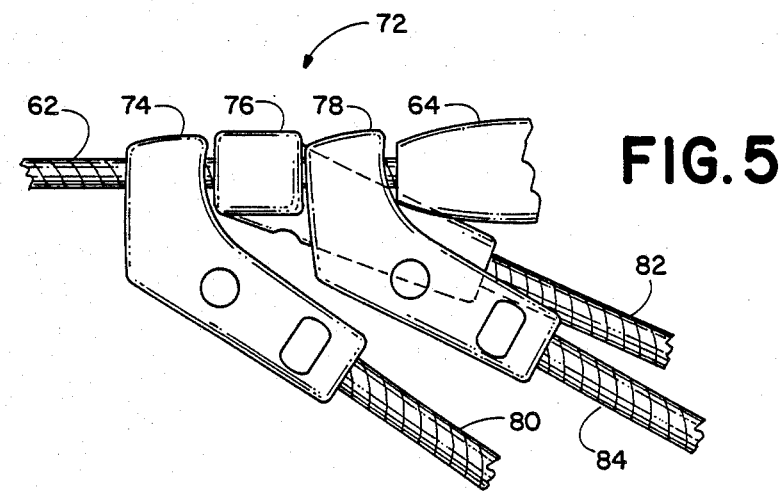
FIG. 5 depicts connectors of the invention on a line in a non-stack-nested condition.

Referring now to FIG. 5, and array 72 of connectors 74, 76 and 78, which are constructed like connector 10 of the instant invention, are depicted on line 62 in a condition which would occur following loading of the array by logs attached to choker cable 80, 82 and 84, respectively. The assymmetrical characteristic of anti-nesting structure 42 promote rocking of adjacent connectors so as to dislodge one connector when it becomes stacked on an adjacent connector. With the connectors in a non-stacked condition, line 62 retains its flexibility and is able to go over pulleys or around other bends which it may encounter in the process of being drawn towards the central yarding facility. The maintenance of such flexibility ensures that cable 62 will not have undue strain placed therein and will therefore experience only normal wear.

The connector of the invention provides a mechanism for connecting a choker cable to a hauling line which allows the end of the choker cable and the nubbin attached thereto to move freely in the connector yet will not allow the nubbin to escape should the line become slack, regardless of the orientation of the connector. The nubbin is easily inserted in and removed from the connector without intricate manipulation. In the event of a break in the hauling line, the connectors will remain attached to the choker cables which will prevent loss of the connectors. An anti-nesting structure on the connector prevents adjacent connectors from arranging themselves in a nested condition which would eliminate flexibility in a portion of the hauling line, an unflexible hauling line is more apt to break, thereby stopping yarding operations. The pressure of the anti-nesting structure therefore facilitates continuous yarding operations.

Although a preferred embodiment of the invention and a variation thereof have been described, it should be appreciated that variations and modifications may be made thereto without departing from the spirit of the invention.

It is claimed and desired to secure as Letters Patent:

1. A line connector for use in connecting a choker cable, having a nubbin at an end thereof, to a line, which has abutment means thereon, the connector comprising:

an elongate body having a sidewall thereabout, a base at one end thereof and a nubbin-receiving chamber therein, said chamber having an upper, nubbin-insertion region sized freely to receive a nubbin therein, and a lower, nubbin-seating region, said chamber further including a first opening in said sidewall adjacent said upper region sized to allow passage of a nubbin therethrough and a second opening in said sidewall, located below and connected to said first opening, which extends into said base, sized to allow passage only of a cable therethrough;

a spring-biased nubbin retainer located at the upper end of said nubbin-insertion region, said retainer including a shaft extending through and axially movable in the upper end of said nubbin-insertion region, and a plate mounted on the end of said shaft in said nubbin-insertion region, said shaft and plate being constructed and arranged such that the plate, when fully extended into said insertion region, is spaced apart from a nubbin seated in said seating region; and attachment means for attaching the connector to the line.

2. The connector of claim 1 wherein said plate is biased to an extended position by a cone spring which encircles said shaft.

3. The connector of claim 1 wherein said plate has a substantially flat nubbin contacting surface.

4. The connector of claim 1 wherein said plate has a cup-shaped nubbin contacting surface.

5. The connector of claim 1 wherein said head includes an anti-nesting structure to prevent necked stacking, on a line, of one connector upon a connector adjacent thereto.

6. The connector of claim 1 wherein said attachment means includes a head fixed to the other end of said body which extends laterally to one side of said body and a first region between said body and the lower side of said head on said one side has a first radius of curvature, and wherein said connector includes an anti-nesting structure located on the upper side of said head diametrically opposite said first region which has a second radius of curvature smaller than that of said first radius of curvature, thereby presenting a small-radius fulcrum to said first region to facilitate rocking of the connector which is in contact with a second connector adjacent thereto on the line, thereby to dislodge adjacent connectors from a nested condition.

7. A line connector for use in connecting a choker cable, having a nubbin at an end thereof, to a line, which has abutment means thereon, the connector comprising:

an elongate body including a sidewall thereabout, a base at one end thereof and a nubbin-receiving chamber therein, said chamber having an upper, nubbin-insertion region sized freely to receive a nubbin therein, and a lower, nubbin-seating region, said chamber further including a first opening in said sidewall adjacent said upper region sized to allow passage of a nubbin therethrough and a second opening in said sidewall, located below and connected to said first opening, which extends into said base, sized to allow passage only of a cable therethrough; and a spring-biased nubbin retainer located at the upper end of said nubbin-insertion region, said retainer including a shaft extending through and axially movable in the upper end of said nubbin-insertion region and a plate mounted on the end of said shaft in said nubbin-insertion region, said shaft and plate being constructed and arranged such that the plate, when fully extended into said insertion region, is spaced apart from a nubbin seated in said seating region; and a head affixed to the upper end of said body extending laterally to one side thereof, the region between said body and said head on said one side having a first radius of curvature, the region opposed to said one side having an anti-nesting structure thereon, said structure having a second radius of curvature which is smaller than that of said first radius of curvature.

8. The connector of claim 7 wherein said plate is biased to an extended position by a cone spring which encircles said shaft.

9. The connector of claim 7 wherein said plate has a substantially flat nubbin contacting surface.

10. The connector of claim 7 wherein said plate has a cup-shaped nubbin contacting surface.

11. A line connector for use in connecting a choker cable, having a nubbin at an end thereof, to a line, which has abutment means thereon, the connector comprising:

an elongate body including a sidewall thereabout, a base at one end thereof and a nubbin-receiving chamber therein, said chamber having an upper, nubbin-insertion region sized freely to receive a nubbin therein, and a lower, nubbin seating region, said chamber further including a first opening in said sidewall adjacent said upper region sized to allow passage of a nubbin therethrough and a second opening in said sidewall, located below and connected to said first opening, which extends into said base, sized to allow passage only of a cable therethrough; and a head located at the other end of said body including a wasted, cable-receiving area, and surrounded about the periphery thereof by a bail and a formation having an asymmetry characteristic which prevents adjacent connectors on a line from stack-nesting.

12. The connector of claim 11 which includes a spring-biased nubbin retainer located at the upper end of said nubbin-insertion region, said retainer including a shaft extending through and axially movable in the upper end of said nubbin-insertion region and a plate mounted on the end of said shaft in said nubbin-insertion region, said shaft and plate being constructed and arranged such that the plate, when fully extended into said insertion region, is spaced apart from a nubbin seated in said seating region.

13. The connector of claim 12 wherein said plate is biased to an extended position by a cone spring which encircles said shaft.

14. The connector of claim 12 wherein said plate has a substantially flat nubbin contacting surface.

15. The connector of claim 12 wherein said plate has a cup-shaped nubbin contacting surface.

16. A line connector for use in connecting a choker cable, having a nubbin at an end thereof, to a line, which has abutment means thereon, the connector comprising:

an elongate body having a sidewall thereabout, a base at one end thereof and a nubbin-receiving chamber therein, said chamber having an upper, nubbin-insertion region sized freely to receive a nubbin therein, and a lower, nubbin seating region, said chamber further including a first opening in said sidewall adjacent said upper region sized to allow passage of a nubbin therethrough and a second opening in said sidewall, located below and connected to said first opening, which extends into said base, sized to allow passage only of a cable therethrough;

a spring-biased nubbin retainer located at the upper end of said nubbin-insertion region, said retainer including a shaft extending through and axially movable in the upper end of said nubbin-insertion region, and a plate mounted on the end of said shaft in said nubbin-insertion region, said shaft and plate being constructed and arranged such that the plate, when fully extended into said insertion region, is spaced apart from a nubbin seated in said seating region; and a head affixed to an end of said body having an elbow-like bend between said body and said head, said bend having an inner radius and a relatively smaller outer radius such that the inner radius of a connector received on the line will confront the larger, outer radius of a second, like connector and be rotated off of the second connector.

17. The connector of claim 16 wherein said plate is biased to an extended position by a cone spring which encircles said shaft.

18. The connector of claim 16 wherein said plate has a substantially flat nubbin contacting surface.

19. The connector of claim 16 wherein said plate has a cup-shaped nubbin contacting surface.

* * * * *